United States Patent [19]

Toyooka et al.

[11] Patent Number: 4,555,555
[45] Date of Patent: Nov. 26, 1985

[54] PROCESS FOR POLYMERIZING VINYL CHLORIDE WITH A SCALE PREVENTION COMPOUND COATED ON A REACTION SURFACE

[75] Inventors: Eietsu Toyooka; Yoshio Tomishima; Yasuhiro Nojima, all of Hyogo, Japan

[73] Assignee: Kanegafuchi Kagaku Kogyo Kabushiki Kaisha, Osaka, Japan

[21] Appl. No.: 571,418

[22] Filed: Jan. 17, 1984

Related U.S. Application Data

[63] Continuation-in-part of Ser. No. 344,266, Jan. 28, 1982, abandoned.

[30] Foreign Application Priority Data

May 22, 1981 [JP] Japan .................................. 56-78388
May 22, 1981 [JP] Japan .................................. 56-78389

[51] Int. Cl.$^4$ ............................ C08F 2/34; C08F 2/16
[52] U.S. Cl. ....................................... 526/62; 526/202
[58] Field of Search ......................................... 526/62

[56] References Cited

U.S. PATENT DOCUMENTS 3,825,434  7/1974  Berens .................................. 526/62
4,076,931  2/1978  Katayama ............................. 526/62
4,093,787  6/1978  Burgess ................................ 526/62
4,320,215  3/1982  Yonezawa ............................ 526/62

FOREIGN PATENT DOCUMENTS 47486    4/1978   Japan .................................... 526/62
130642  11/1978   Japan .................................... 526/62
36389    3/1979   Japan .................................... 526/62
107991   8/1979   Japan .................................... 526/62
54305    4/1980   Japan .................................... 526/62
54317    4/1980   Japan .................................... 526/62

*Primary Examiner*—Christopher A. Henderson
*Attorney, Agent, or Firm*—Sughrue, Mion, Zinn, Macpeak, and Seas

[57] ABSTRACT

A process for polymerizing vinyl chloride is disclosed which comprises coating prior to the polymerization the surfaces of a polymerization reactor, agitator blades and a reflux condenser with a reaction product obtained by the reaction of a phenolic compound and an aromatic aldehyde, said reaction product having an average molecular weight of from 3,000 to 10,000. Not only is the polymer scales formation prevented surprisingly, but a high quality product substantially free from fish eyes is obtained.

6 Claims, No Drawings

PROCESS FOR POLYMERIZING VINYL CHLORIDE WITH A SCALE PREVENTION COMPOUND COATED ON A REACTION SURFACE

CROSS-REFERENCES TO RELATED APPLICATION

The present invention applicaiton is a continuation-in-part application to U.S. patent application Ser. No. 344,266, filed Jan. 28, 1982, now abandoned.

BACKGROUND OF THE INVENTION

1. Field of the Invention

The present invention relates to a process for the polymerization of vinyl chloride which is characterized by coating prior to polymerization the inside surfaces of a polymerization reactor with a specified reaction product which is obtained by the reaction of a phenolic compound and an aromatic aldehyde. More particularly, it pertains to a process for preventing polymer scales deposition in which in the polymerization of vinyl chloride, polymer scales are prevented by the coating of the foregoing compound from depositing onto the surfaces of the polymerization reactor, agitator blades, baffle plates, a reflux condenser with which the polymerization reactor is equipped, and nozzles of pipes arranged.

2. Description of the Prior Art

In the suspension polymerization of vinyl chloride alone or a monomeric mixture of vinyl chloride as a major component and other monomers copolymerizable therewith as a minor component in an aqueous reaction medium in the presence of a suspending agent and an oil-soluble catalyst, the emulsion polymerization in the presence of an emulsifying agent and a water-soluble catalyst or the bulk polymerization in a liquid or gaseous phase, there is brought about a problem that polymer scales are formed and deposited onto the surfaces of the polymerization reactor, the reflux condenser, nozzles of pipes arranged and the like. The polymer scales deposition invites numerous disadvantages including, for example, decrease the efficiency of heat conduction of the polymerization reactor, decrease of polymer yield, decrease of properties of the polymer product due to fish eyes caused by intermixing of polymer scales peeled off, blockade of the reflux condenser, and nozzles of pipes arranged, and decrease in the operation efficiency of the polymerization reactor due to a great deal of labor and time required for the removal of such polymer scales.

In order to solve these problems, many processes have been proposed for preventing formation and deposition of polymer scales, but they possess merits and demerits and thus a practically satisfactory scales prevention process has never been proposed.

In an attempt to overcome the problems, the present inventors have synthesized a variety of compounds and studied the scales prevention effect thereon in the suspension polymerization, emulsion polymerization or bulk polymerization to thereby find out that a specific class of reaction products obtained by the reaction of a phenolic compound and an aromatic aldehyde produces an outstanding effect of polymer scales prevention.

SUMMARY OF THE INVENTION

It is therefore an object of the present invention to provide a process for polymerizing vinyl chloride which prevents polymer scales formation or deposition onto the surfaces of a polymerization reactor, agitator blades, a reflux condenser, nozzles of pipes arranged and the like.

It is another object of the present invention to provide a process for polymerizing vinyl chloride which is capable of production of vinyl chloride resin substantially free from fish eyes.

These and other objects of the present invention together with the advantages thereof will become apparent to those skilled in the art from the detailed disclosure of the present invention as set forth hereinbelow.

The present invention has been completed on the discovery that the polymer scales formation or deposition can be markedly prevented by coating the surfaces of the polymerization reactor, the agitator blades, the reflux condenser positioned to the polymerization reactor, nozzles of pipes arranged and the like with a specific reaction product obtained by the reaction of a phenolic compound and an aromatic aldehyde.

DETAILED DESCRIPTION OF THE INVENTION

A reaction product obtained by the reaction of a phenolic compound and an aromatic aldehyde, herein, is understood to mean a reaction product obtained by the reaction of at least one compound selected from the group consisting of pyrogallol, hydroxyhydroquinone and other phenolic compounds with an aromatic aldehyde, said reaction product having an average molecular weight of from 3,000 to 10,000.

As the reaction product, there may be included, for example, a reaction product of pyrogallol and benzaldehyde and a reaction product of hydroxyhydroquinone and benzaldehyde.

The reaction product used in the present invention may be synthesized by allowing to react 1 mole of a phenolic compound with 1 to 20 moles, preferably 1 to 10 moles of aromatic aldehyde in an aqueous reaction medium or an organic solvent under acidic conditions. Under the foregoing conditions where aromatic aldehyde is used in a greater amount than phenolic compound, a reaction product with an average molecular weight of from 3,000 to 10,000 is normally obtained.

The acidic conditions for obtaining the reaction products of the present invention may be provided by the use of known acids including such as hydrochloric acid, phosphoric acid, formic acid, acetic acid, oxalic acid, p-toluenesulfonic acid and the like. The reaction time is 1 hour to 40 hours, more preferably 2 hours to 30 hours and the reaction temperature is 40° C. to 120° C., more preferably 60° C. to 110° C. The reaction time and the reaction temperature may be selected and combined optionally from the foregoing ranges.

Meanwhile, an average molecular weight of a reaction product of the present invention was determined according to a gel permeation of chromatograph (G.P.C.) method, referring to polyethylene glycol with a known molecular weight.

The phenolic compound used in the present invention may be exemplified by phenol, p-bromophenol, 2,4,6-tribromophenol, 2,6-dimethylphenol, cresol; divalent phenols such as catecohol, hydro quinone, resorcine, 4-t-butyl-1,2-dihydroxybenzene; trivalent phenols such as pyrogallol, hydroxyhydroquinone and phloroglucin, but not specifically limited thereto. These are used singly or in combination of two or more. Among those, a compound having a backbone of pyrogallol or hydroxyhydroquinone produces a particularly marked effect as a scales-preventing agent for use in the polymerization of vinyl chloride and therefore it is preferred to employ pyrogallol or hydroxyhydroquinone as a phenolic compound.

As the aromatic aldehyde used in the present invention, and aldehyde having a benzene nucleus substitution product may be used and, above all, nonsubstituted benzaldehyde is the most advantageous in cost as a scales-preventing agent for the polymerization of vinyl chloride.

The reaction product having an average molecular weight of from 3,000 to 10,000 is used preferably. In the case of less than 2,000, the compound dissolves in the polymerization system during polymerization because of low melting point or poor hot water resistance property. In contrast, in the case of at least 3,000, the compound is superior in heat resistance and hot water resistance properties and thus does not dissolve in the polymerization system during polymerization, whereby a surprisingly striking scales prevention effect is achieved. As is apparent from the foregoing, the higher an average molecular weight is, the greater the scales prevention effect becomes. However, regrettably, the reaction product having an average molecular weight of more than 10,000 is not yet obtainable with the present our experimental technique.

When a phenolic compound is allowed to react with an aromatic aldehyde in a greater amount of the latter than that of the former, a reaction product obtained has normally an average molecular weight of at least 2,000, exhibiting a superior scales prevention effect. Inversely, when a phenolic compound is used in a greater amount, a reaction product having an average molecular weight of less than 2,000 is normally obtained. In this case, the reaction product gives a small scales prevention effect.

The compound may be diluted with a suitable solvent and then applied to the surfaces of the polymerization reactor, the reflux condenser and the like. The solvent is not specifically limited, including, for example, tetrahydrofuran, dioxane, methanol, ethanol, acetone, dimethylformamide, dimethylsulfoxide and a mixture thereof.

An amount of the foregoing compound coated is normally in a range of from 0.001 g/m$^2$ to 1 g/m$^2$, but a sufficient effect is obtained even in an amount of from 0.001 g/m$^2$ to 0.2 g/m$^2$ because of much superior scales prevention effects. The foregoing upper limit is a practical one which does not prevent the use in an amount exceeding it, unless an adverse effect occurs on quality and cost of the product. The coating of the compound may be effected by any known manner, for example, brushing, steeping, spraying by a spray nozzle and filling up of mist in the reactor by using such as a two-fluid nozzle.

The compound of the present invention is effectively applied to any type of polymerization process for vinyl chloride or a monomeric mixture mainly containing vinyl chloride, more effectively to suspension polymerization, emulsion polymerization and liquid phase or gaseous phase bulk polymerization. According to the present invention, polymer scales deposition, even after the termination of polymerization, is not observed at all onto the inside surfaces of the polymerization reactor, the reflux condenser, the nozzles of pipes arranged and the like, and hence operation for polymer scales removal by the use of high pressure water jet and the like is not required.

Other monomers copolymerizable with vinyl chloride used in the present invention may include vinyl esters such as vinyl acetate, vinyl propionate and vinyl stearate; vinyl ethers such as methyl vinyl ether; carboxylic acids such as acrylic acid and methacrylic acid; esters of acrylic acid or methacrylic acid such as methyl acrylate, butyl acrylate, methyl methacrylate and hydroxyethyl methacrylate; maleic acid or fumaric acid and anhydrides or esters thereof; olefines such as ethylene and propylene; halogenated olefines such as vinylidene chloride, vinyl bromide and vinyl fluoride; nitrilic compounds such as acrylonitrile and methacrylonitrile, and the like.

As the polymerization process of vinyl chloride alone or a monomeric mixture of vinyl chloride and the foregoing other copolymerizable monomers therewith, suspension polymerization, emulsion polymerization, bulk polymerization and the like are well-known to those skilled in the art. The suspension polymerization is carried out in an aqueous reaction medium in the presence of a suspending agent and an oil-soluble catalyst and the emulsion polymerization is effected likewise in an aqueous reaction medium in the presence of an emulsifying agent and a water-soluble catalyst, or further a reducing agent, if required. The liquid phase bulk polymerization is carried out in the presence of an oil-soluble catalyst and the gaseous phase bulk polymerization is performed in the presence of seed particles impregnated with an initiator by supplying a gaseous monomer to a reactor.

The oil-soluble initiator used in the present invention may include organic peroxides such as known benzoyl peroxide, lauroyl peroxide, di-2-ethylhexyl peroxydicarbonate, di-isopropyl peroxydicarbonate, di-sec-butyl peroxydicarbonate, di-2-ethoxyethyl peroxydicarbonate, t-butyl peroxypivalate, t-tubyl peroxyneodecanoate, acetyl cyclohexylsufonyl peroxide, acetyl-sec-heptylsufonyl peroxide and diisobutyryl peroxide; and azo-compounds such as 2,2'-azobis(2,4-dimethylvaleronitrile), 2,2'-azobisisobutylonitrile and 2,2'-azobis(4-methoxy-2,4-dimethylvaleronitrile) and those are used singly or in combination of two or more. In order to allow the scales prevention effect to last long, an initiator with considerably small solubility to water is preferred. Such the initiator may include di-2-ethylhyxyl peroxydicarbonate, bis-(4-t-butylcyclohexyl)peroxydicarbonate, bis-3,5,5-trimethylhexanoyl peroxide, dicetyl peroxydicarbonate, 2,2'-azobis(2,4-dimethylvaleronitrile), 2,2'-azobisisobutylonitrile and 2,2'-azobis(4-methoxy-2,4-dimethylvaleronitrile) and those are used singly or in combination of two or more.

The suspending agent used in the suspension polymerization of the present invention may include partially saponified polyvinyl acetate, polyacrylic acid, copolymers of maleic anhydride, cellulose derivatives, gelatin, starch and any other known suspending agent, not limited thereto specifically.

The emulsifying agent used in the emulsion polymerization of the present invention may include anionic emulsifying agents such as sodium alkylbenzene sulfonate, sodium lauryl sulfonate and sodium dioctylsulfosuccinate; and non-ionic emulsifying agents such as polyoxyethylene alkyl ether, polyoxyethylene alkyl allyl ether and polyoxyethylene sorbitan fatty acid partial ester, which are well known.

The water-soluble catalyst may include ammonium persulfate, potassium persulfate, hydrogen peroxide and the like. The redox catalyst may also be employed, if required, which comprises the combined use of the foregoing water-soluble catalyst and a reducing agent such as ferrous sulfate, sodium sulfite, L- or D-ascorbic acid.

The oil-soluble catalyst used in the bulk polymerization of the present invention may include known organic peroxides or azo-compounds such as aforesaid in the case of the suspension polymerization.

The polymerization temperature is a decomposition temperature of an initiator and is normally in a range of from about 40° C. to about 80° C. A known heat stability improving agent such as a phenolic antioxidant, a known chain transfer agent such as trichloroethylene, 2-mercaptoethanol, or the like may be further added without any adverse effects.

Hereinbelow, the present invention will be explained in more detail by way of examples that follow, which should not be construed as limiting the scope of the invention.

EXAMPLE 1, COMPARATIVE EXAMPLE 1

(1) Synthesis of a coating compound-A 378 g (3 moles) of pyrogallol were dissolved in 1 liter of water, to which 212 g (2 moles) of benzaldehyde and 294 g (3 moles) of phosphoric acid were added, then the obtained mixture were allowed to react at 100° C. for 6 hours. The red orange product insoluble in water was prepared. The product was subjected to the measurement of a molecular weight according to G.P.C. by the use of polyethylene glycol as a standard specimen. An average molecular weight of the product was approximately 800. Hereinafter, the product is called compound-A.

(2) Synthesis of a coating compound-B 151 g (1.2 moles) of pyrogallol were allowed to react with 106 g (1 mole) of benzaldehyde in a similar manner to the case of compound-A to thus obtain the red orange product being solid and insoluble in water. The product (compound-B) has had an average molecular weight of approximately 1600 (according to G.P.C.).

(3) Synthesis of a coating compound-C 126 g (1 mole) of pyrogallol were allowed to react with 127 g (1.2 moles) of benzaldehyde in a similar manner to the case of (1), thereby obtaining the red purple product (compound-C) insoluble in water having an average molecular weight of 3,000 (according to G.P.C.).

(4) Synthesis of a coating compound-D 126 g (1 mole) of pyrogallol and 212 g (2 moles) of benzaldehyde were allowed to react in a similar manner to the case of (1), thereby the water-insoluble red brown product (compound-D) having an average molecular weight of 4,000 (according to G.P.C.) being obtained.

(5) Synthesis of a coating compound-E 126 g (1 mole) of pyrogallol were allowed to react with 318 g (3 moles) of benzaldehyde in a similar manner to the case of (1), thereby obtaining the red brown product (compound-E) being solid and insoluble in water having an average molecular weight of approximately 6,000 (according to G.P.C.).

(6) Synthesis of a coating compound-F 126 g (1 mole) of pyrogallol were dissolved in 1 liter of water, to which 1,060 g (10 moles) of benzaldehyde and 294 g (3 moles) of phosphoric acid were added, then obtained mixture were allowed to react at 105° C. for 24 hours. The red brown product (compound-F) being solid and insoluble in water was prepared. An average molecular weight of the product was approximately 10,000 (according to G.P.C.).

(7) Polymer scales prevention effect

The inside surfaces of a stainless steel polymerization reactor having an inside capacity of 1,000 liters (inner surface area: approximately 5 m²) were coated with a compound, (A), (B), (C), (D), (E) or (F) which was dissolved in methanol, respectively. An amount of the compound coated was 0.02 g/m², respectively.

After coating, 200 kg of vinyl chloride monomer, 450 kg of pure water, 180 g of partially saponified polyvinyl acetate and 60 g of di-2-ethylhexylperoxydicarbonate were charged into the reactor, then the polymerization was conducted at 60° C. until the yield of polyvinyl chloride became 75% or more. After the polymerization, the obtained slurry was removed, then the deposition of the polymer scales was observed and the polymerization was repeated until the scales were formed.

The repeated number of polymerization was tabulated in Table-I.

It is apparent from the Table-I that the compounds having an average molecular weight of from 3,000 to 10,000 produce an outstanding scales prevention effect.

TABLE I

| Coating compound | Name | Comparative Example | | | | Example | | |
|---|---|---|---|---|---|---|---|---|
| | | None | A | B | C | D | E | F |
| | Average molecular weight | — | 800 | 1,600 | 3,000 | 4,000 | 6,000 | 10,000 |
| Amount of compound coated (g/m²) | | — | 0.02 | 0.02 | 0.02 | 0.02 | 0.02 | 0.02 |
| Number of repeated polymerization until the formation of scales | | 1 | 2 | 3 | 25 | 30 | 37 | 42 |

EXAMPLE 2

The compound-D having an average molecular weight of 4,000 prepared in Example 1 was dissolved in methanol, with which the inside surfaces of the polymerization reactor having an inside capacity of 1,000 liters were coated. An amount coated was 20 mg/m².

Into the reactor, were charged 450 kg of pure water, 900 g of sodium lauryl sulfate and 240 g of ammonium persulfate. Then, 150 kg of vinyl chloride were charged and polymerized at 55° C. for 10 hours. After the polymerization terminated, the polymer product was removed and the inside surfaces of the reactor were observed, but no scales deposition took place. In contrast, in the case where no coating compound was applied scales amounting to 350 g/m² deposited.

EXAMPLE 3

The inside surfaces of a 1,000 liters inside capacity stainless steel polymerization reactor were coated with the compound-D having an average molecular weight of 4,000 prepared in Example 1 dissolved in methanol in an amount coated of 20 mg/m².

Into the reactor so treated, 180 kg of vinyl chloride, 20 kg of vinyl acetate, 180 g of partially saponified polyvinyl acetate and 50 g of 2,2'-azobis(2,4-dimethylvaleronitrile were charged and then polymerized at 60° C. for 10 hours. After polymerization, the polymer slurry was removed for the observation of scales, but no scales deposited. On the other hand, in the absence of the coating compound there were noticed 450 g/m² of scales.

EXAMPLE 4

The coating compound-D having an average molecular weight of 4,000 prepared in Example I was dissolved in methanol, with which the inside surfaces of a stainless steel autoclave having an inside capacity of 20 liters were coated in an amount of 20 mg/m². Into so treated autoclave, 10 kg of vinyl chloride containing 0.03% by weight of 2,2'-azobis(2,4-dimethylvaleronitrile) was charged and bulk polymerized at 55° C. for 10 hours. After the polymerization terminated, no scales deposition was noticed on the inside surfaces of the autoclave, while in the absence of the coating compound 120 g/m² of scales deposited.

EXAMPLE 5

At a gaseous phase portion of a stainless steel polymerization reactor of which inside capacity is 1,000 liters, was positioned a stainless steel multitube type reflux condenser having a heating surface of 3 m². To the inside surfaces of the reactor and the reflux condenser, the compound-D having an average molecular weight of 4,000 prepared in Example 1 was dissolved in methanol and then applied in an amount of 20 mg/m². After coating, 200 kg of vinyl chloride, 450 kg of pure water, 180 g of partially saponified polyvinyl acetate and 100 g of di-2-ethylhexylperoxydicarbonate were charged into the reactor, then polymerized at 60° C. for 6 hours, while the reflux condenser was operating for the commencement of the polymerization. An amount of heat removed by the reflux condenser was 60% of the total amount of heat emitted. After polymerization, the polymer slurry was removed for the inspection of scales deposited but no scales deposition took place.

In contrast, when no compound was applied, 320 g/m² of scales deposited onto the inside surfaces of the reactor and 200 g/m² of scales deposited onto the inside of the reflux condenser.

EXAMPLE 6

The inside surfaces of a stainless steel polymerization reactor having an inside capacity of 1,000 liters (inner surface area; approximately 5 m²) were coated with a compound-D prepared in Example 1, which was dissolved in methanol. An amount of the compound coated was 20 mg/m².

After coating, 200 kg of vinyl chloride, 450 kg of pure water, 180 g of partially saponified polyvinyl acetate and 60 g of an initiator listed up in Table 2 were charged into the reactor, then the polymerization was conducted at 60° C. until the yield of polyvinyl chloride became 75% or more. After the polymerization the deposition of the polymer scales was observed and the polymerization was repeated until the scales were formed (but the polymerization was stopped after repetition of 30 times). The repeated number of polymerization was provided in Table-II.

| Initiator | Coating compound Number of repeated polymerization until the formation of scales | |
|---|---|---|
| | None | Compound-D |
| di-2-ethylhexylperoxydicarbonate | 1 | 30 |
| 2,2'-azobis (2,4-dimethylvaleronitrile | 1 | 30 |
| di-2-ethoxyethylperoxydicarbonate | 1 | 18 |
| t-butyl peroxypivalate | 1 | 22 |

It is apparent from the above results that the compound-D exhibits a good lasting effect of the scales prevention, and a much superior lasting effect especially when used in conjunction with a specified initiator.

What we claim is:

1. In a process for polymerizing vinyl chloride alone or a monomeric mixture of vinyl chloride as a major component and other monomers copolymerizable therewith as a minor component, the improvement which comprises coating, prior to the polymerization, the surfaces of a polymerization reactor, agitator blades and a reflux condenser positioned to the polymerization reactor, with a reaction product obtained by the reaction of a phenolic compound selected from the group consisting of pyrogallol and hydroxyhydroquinone with benzaldehyde, wherein said reaction product has an average molecular weight of from 3,000 to 10,000 and is coated onto said surfaces in a range from about 0.001 g/m² to about 0.2 g/m².

2. The process of claim 1, wherein a polymerization process is suspension polymerization using an oil-soluble initiator.

3. The process of claim 1, wherein a polymerization process is emulsion polymerization.

4. The process of claim 1, wherein a polymerization is liquid phase or gaseous phase bulk polymerization.

5. The process of claim 2, wherein the oil-soluble initiator is at least one member selected from the group consisting of di-2-ethylhexyl peroxydicarbonate, bis(4-t-butyl cyclohexyl)peroxydicarbonate, bis-3,5,5-trimethyl hexanoyl peroxide, di-cetyl peroxydicarbonate, 2,2'-azobis(2,4-dimethylvaleronitrile), 2,2'-azobisisobutylonitrile and 2,2'-azobis(4-methoxy-2,4-dimethylvaleronitrile).

6. The process of claim 1, wherein said phenolic compound and benzaldehyde are reacted under acid conditions.

* * * * *